(12) United States Patent
Jeung et al.

(10) Patent No.: US 7,410,109 B2
(45) Date of Patent: Aug. 12, 2008

(54) LIQUID CRYSTAL DISPENSING APPARATUS WITH NOZZLE PROTECTING DEVICE

(75) Inventors: Young-Hun Jeung, Kyoungsangbuk-Do (KR); Hyug-Jin Kweon, Kyoungsangbuk-do (KR); Hae-Joon Son, Pusan (KR)

(73) Assignee: LG Display Co., Ltd., Seoul (KR)

( * ) Notice: Subject to any disclaimer, the term of this patent is extended or adjusted under 35 U.S.C. 154(b) by 425 days.

(21) Appl. No.: 10/128,440

(22) Filed: Apr. 24, 2002

(65) Prior Publication Data

US 2003/0146297 A1 Aug. 7, 2003

(30) Foreign Application Priority Data

Feb. 7, 2002 (KR) ................... 2002-7151
Feb. 9, 2002 (KR) ................... 2002-7772

(51) Int. Cl.
*B05B 1/30* (2006.01)
(52) U.S. Cl. .................... 239/583; 239/288.3; 239/302; 239/585.1; 251/129.15
(58) Field of Classification Search ................. 239/302, 239/288.3, 288.5, 583, 584, 585.1, 596; 604/131, 604/134, 135, 228; 222/20, 52, 481, 501, 222/507, 512, 544, 630; 118/665, 688; 251/129.15
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | ........... 29/592 R |
| 4,653,864 A | 3/1987 | Baron et al. | |
| 4,691,995 A | 9/1987 | Yamazaki et al. | ....... 350/331 R |
| 4,775,225 A | 10/1988 | Tsuboyama et al. | |
| 4,966,585 A * | 10/1990 | Gangemi | .................... 604/131 |
| 5,032,373 A * | 7/1991 | Jones et al. | ................. 423/522 |
| 5,074,440 A * | 12/1991 | Clements et al. | ....... 222/189.09 |
| 5,247,377 A | 9/1993 | Omeis et al. | .................. 359/76 |
| 5,263,888 A | 11/1993 | Ishihara et al. | |
| 5,379,139 A | 1/1995 | Sato et al. | |
| 5,406,989 A | 4/1995 | Abe | |
| 5,453,591 A * | 9/1995 | Stroud | ........................ 218/43 |
| 5,499,128 A | 3/1996 | Hasegawa et al. | |
| 5,507,323 A | 4/1996 | Abe | |
| 5,511,591 A | 4/1996 | Abe | ............................. 141/7 |

(Continued)

FOREIGN PATENT DOCUMENTS

EP 1 003 066 A1 5/2000

(Continued)

*Primary Examiner*—Steven J Ganey
(74) *Attorney, Agent, or Firm*—McKenna Long & Aldridge LLP

(57) ABSTRACT

A liquid crystal dispensing apparatus dispenses liquid crystal onto a substrate. The apparatus includes a liquid crystal container and a nozzle. The liquid crystal container contains the liquid crystal to be dispensed onto the substrate, and the nozzle is disposed on a lower portion of the liquid crystal container. The nozzle has a main body portion, a discharging portion that projects from a lower surface of the main body portion to dispense liquid crystal, and a protecting portion that projects from the lower surface of the main body portion to protect the dispensing portion. The protecting portion projects from the lower surface of the main body portion at least as much as the discharging portion.

13 Claims, 8 Drawing Sheets

U.S. PATENT DOCUMENTS

| | | | |
|---|---|---|---|
| 5,539,545 A | 7/1996 | Shimizu et al. | |
| 5,548,429 A | 8/1996 | Tsujita | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | von Gutfeld et al. | 349/187 |
| 6,149,623 A * | 11/2000 | Reynolds | 604/82 |
| 6,163,357 A | 12/2000 | Nakamura | 349/155 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,347,648 B1 * | 2/2002 | Wegman et al. | 141/1 |
| 6,357,857 B1 * | 3/2002 | Takemoto et al. | 347/45 |
| 6,401,976 B1 * | 6/2002 | Estelle et al. | 222/52 |
| 6,414,733 B1 | 7/2002 | Ishikawa et al. | 349/110 |
| 6,478,780 B1 * | 11/2002 | Shields | 604/263 |
| 6,594,898 B1 * | 7/2003 | Yun | 29/890.1 |
| 6,610,364 B1 * | 8/2003 | Kweon et al. | 427/256 |
| 6,969,012 B2 * | 11/2005 | Kangas et al. | 239/400 |
| 2001/0021000 A1 | 9/2001 | Egami | 349/187 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-054228 | 3/1987 |
| JP | 62-054229 | 3/1987 |
| JP | 62-89025 | 4/1987 |
| JP | 62-90622 | 4/1987 |
| JP | 62-054225 | 9/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 03-009549 | 1/1991 |
| JP | 04-164256 | 6/1992 |
| JP | 05-036425 | 2/1993 |
| JP | 05-036426 | 2/1993 |
| JP | 05-053125 | 3/1993 |
| JP | 05-107533 | 4/1993 |
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | 06-018829 | 1/1994 |
| JP | 6-51256 | 2/1994 |
| JP | 06-064229 | 3/1994 |
| JP | 6-148657 | 5/1994 |
| JP | 6-160871 | 6/1994 |
| JP | 06-194637 | 7/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 07-248502 | 9/1995 |
| JP | 07-275770 | 10/1995 |
| JP | 07-275771 | 10/1995 |
| JP | 08-076133 | 3/1996 |
| JP | 8-95066 | 4/1996 |
| JP | 8-101395 A | 4/1996 |
| JP | 8-106101 | 4/1996 |
| JP | 08-110504 | 4/1996 |
| JP | 08-122122 | 5/1996 |
| JP | 08-136937 | 5/1996 |
| JP | 8-171094 | 7/1996 |
| JP | 08-173874 | 7/1996 |
| JP | 8-190099 | 7/1996 |
| JP | 8-240807 | 9/1996 |
| JP | 09-001026 | 1/1997 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-174924 | 6/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-262712 | 9/1999 |
| JP | 11-264991 | 9/1999 |
| JP | 11-326922 A | 11/1999 |
| JP | 11-344714 | 12/1999 |
| JP | 2000-2879 | 1/2000 |
| JP | 2000-29035 | 1/2000 |
| JP | 2000-56311 A | 2/2000 |
| JP | 2000-66165 A | 3/2000 |
| JP | 2000-066218 | 3/2000 |
| JP | 2000-093866 | 4/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-308843 | 11/2000 |
| JP | 2000-310759 A | 11/2000 |
| JP | 2000-310784 A | 11/2000 |
| JP | 2000-338501 A | 12/2000 |

| | | | | | | |
|---|---|---|---|---|---|---|
| JP | 2001-5401 | A | 1/2001 | JP | 2002-080321 | 3/2002 |
| JP | 2001-5405 | A | 1/2001 | JP | 2002-82340 | 3/2002 |
| JP | 2001-13506 | A | 1/2001 | JP | 2002-90759 | 3/2002 |
| JP | 2001-33793 | A | 2/2001 | JP | 2002-90760 | 3/2002 |
| JP | 2001-42341 | A | 2/2001 | JP | 2002-107740 | 4/2002 |
| JP | 2001-51284 | A | 2/2001 | JP | 2002-122870 | 4/2002 |
| JP | 2001-66615 | A | 3/2001 | JP | 2002-122872 | 4/2002 |
| JP | 2001-75105 | | 3/2001 | JP | 2002-122873 | 4/2002 |
| JP | 2001-91727 | A | 4/2001 | JP | 2002-131762 | 5/2002 |
| JP | 2001-117105 | | 4/2001 | JP | 2002-139734 | 5/2002 |
| JP | 2001-117109 | A | 4/2001 | JP | 2002-156518 | 5/2002 |
| JP | 2001-133745 | A | 5/2001 | JP | 2002-169166 | 6/2002 |
| JP | 2001-133794 | | 5/2001 | JP | 2002-169167 | 6/2002 |
| JP | 2001-133799 | A | 5/2001 | JP | 2002-182222 | 6/2002 |
| JP | 2001-142074 | | 5/2001 | JP | 2002-202512 | 7/2002 |
| JP | 2001-147437 | | 5/2001 | JP | 2002-202514 | 7/2002 |
| JP | 2001-154211 | | 6/2001 | JP | 2002-214626 | 7/2002 |
| JP | 2001-166272 | A | 6/2001 | JP | 2002-229042 | 8/2002 |
| JP | 2001-166310 | A | 6/2001 | JP | 2002-236276 | 8/2002 |
| JP | 2001-183683 | A | 7/2001 | JP | 2002-258299 | 8/2002 |
| JP | 2001-201750 | A | 7/2001 | JP | 2002-236292 | 9/2002 |
| JP | 2001-209052 | A | 8/2001 | JP | 2002-277865 | 9/2002 |
| JP | 2001-209056 | | 8/2001 | JP | 2002-277866 | 9/2002 |
| JP | 2001-209057 | | 8/2001 | JP | 2002-277881 | 9/2002 |
| JP | 2001-209058 | | 8/2001 | JP | 2002-287156 | 10/2002 |
| JP | 2001-209060 | A | 8/2001 | JP | 2002-296605 | 10/2002 |
| JP | 2001-215459 | A | 8/2001 | JP | 2002-311438 | 10/2002 |
| JP | 2001-222017 | A | 8/2001 | JP | 2002-311442 | 10/2002 |
| JP | 2001-235758 | A | 8/2001 | JP | 2002-318378 | 10/2002 |
| JP | 2001-255542 | | 9/2001 | JP | 2002311440 | 10/2002 |
| JP | 2001-264782 | | 9/2001 | JP | 2002-323687 | 11/2002 |
| JP | 2001-272640 | | 10/2001 | JP | 2002-323694 | 11/2002 |
| JP | 2001-272640 | A | 10/2001 | JP | 2002-333628 | 11/2002 |
| JP | 2001-281675 | A | 10/2001 | JP | 2002-333635 | 11/2002 |
| JP | 2001-281678 | A | 10/2001 | JP | 2002-333843 | 11/2002 |
| JP | 2001-282126 | A | 10/2001 | JP | 2002-341329 | 11/2002 |
| JP | 2001-305563 | A | 10/2001 | JP | 2002-341355 | 11/2002 |
| JP | 2001-330837 | A | 11/2001 | JP | 2002-341356 | 11/2002 |
| JP | 2001-330840 | | 11/2001 | JP | 2002-341357 | 11/2002 |
| JP | 2001-356353 | A | 12/2001 | JP | 2002-341358 | 11/2002 |
| JP | 2001-356354 | | 12/2001 | JP | 2002-341359 | 11/2002 |
| JP | 2002-14360 | | 1/2002 | JP | 2002-341362 | 11/2002 |
| JP | 2002-23176 | | 1/2002 | JP | 2003-91011 | 3/2003 |
| JP | 2002-49045 | | 2/2002 | KR | 2000-0035302 A | 6/2000 |
| JP | 2002-079160 | | 3/2002 | | | |

* cited by examiner

LIQUID CRYSTAL DISPENSING APPARATUS WITH NOZZLE PROTECTING DEVICE

The present application claims the benefit of Korean Patent Application Nos. 7151/2002 and 7772/2002 respectively filed in Korea on Feb. 7, 2002 and Feb. 9, 2002, which are both hereby incorporated by reference.

BACKGROUND OF THE INVENTION

1. Field of the Invention

The present invention relates to a liquid crystal dispensing apparatus, and more particularly, to a liquid crystal dispensing apparatus for preventing scatter of the liquid crystal resulting from damage to the nozzle from which the liquid crystal is discharged and dropped from the liquid crystal dispensing apparatus. In addition, the present invention relates to a liquid crystal dispensing apparatus for preventing the liquid crystal from being lumped around the nozzle.

2. Description of the Related Art

Recently, various portable electric devices such as mobile phones, personal digital assistants (PDA), and notebook computers have been developed, and therefore, needs for a flat panel display device used in small, light weight, and power-efficient devices for such portable devices are correspondingly increasing. To meet the needs, the flat panel display device such as a liquid crystal display (LCD), a plasma display panel (PDP), a field emission display (FED), a and vacuum fluorescent display (VFD) have been actively researched. Of these flat panel display devices, the LCD is highlighted due to current mass production, efficient driving schemes, and superior image quality.

The LCD is a device for displaying information on a screen using refractive anisotropy of liquid crystal. As shown in FIG. 1, the LCD 1 comprises a lower substrate 5, an upper substrate 3, and a liquid crystal layer 7 formed between the lower substrate 5 and the upper substrate 3. The lower substrate 5 is a driving device array substrate. A plurality of pixels (not shown) are formed on the lower substrate 5, and a driving device such as a thin film transistor (TFT) is formed on the each pixel. The upper substrate 3 is a color filter substrate, and a color filter layer for reproducing real color is formed thereon. Further, a pixel electrode and a common electrode are formed on the lower substrate 5 and the upper substrate 3 respectively. An alignment layer is formed on the lower substrate 5 and the upper substrate 3 to align liquid crystal molecules of the liquid crystal layer 7 uniformly.

The lower substrate 5 and the upper substrate 3 are attached by a sealing material 9, and the liquid crystal layer 7 is formed therebetween. In addition, the liquid crystal molecules are reoriented by the driving device formed on the lower substrate 5 to control the amount of light transmitted through the liquid crystal layer, thereby displaying information.

Fabrication processes for a LCD device can be divided into a driving device array substrate process for forming the driving device on the lower substrate 5, a color filter substrate process for forming the color filter on the upper substrate 3, and a cell process. These processes will be described with reference to FIG. 2 as follows.

At first, a plurality of gate lines and data lines are arranged on the lower substrate to define a pixel area by the driving device array process and the thin film transistor connected to the both gate line and the data line is formed on the each pixel area (S101). Also, a pixel electrode, which is connected to the thin film transistor to drive the liquid crystal layer according to a signal applied through the thin film transistor, is formed by the driving device array process.

At the same time, R (Red), G (Green), and B (Blue) color filter layers for reproducing the color and a common electrode are formed on the upper substrate 3 by the color filter process (S104).

In addition, the alignment layer is formed on the lower substrate 5 and the upper substrate 3 respectively, and then the alignment layer is rubbed in order to induce an surface anchoring (that is, a pretilt angle and alignment direction) to the liquid crystal molecules of the liquid crystal layer between the lower substrate 5 and the upper substrate 3 (S102 and S105). Thereafter, a spacer for maintaining the cell gap constant and uniform is dispersed on the lower substrate 5. Then, the sealing material is applied on an outer portion of the upper substrate 3 to attach the lower substrate 5 to the upper substrate 3 by compression (S103, S106, and S107).

On the other hand, the lower substrate 5 and the upper substrate 3 are made from a glass substrate of larger area. That is, the large glass substrate includes a plurality of unit panel areas in which the driving device such as TFT and the color filter layer are formed on. To fabricate the individual liquid crystal unit panel, the assembled glass substrate should be cut into unit panels (S108). Thereafter, the liquid crystal is injected into the empty individual liquid crystal unit panel through a liquid crystal injection opening (S109). The liquid crystal unit panel filled with the liquid crystal is completed by sealing the liquid crystal injection opening, and each liquid crystal unit panel is inspected (S110).

As described above, liquid crystal is injected through the liquid crystal injection opening. At that time, the injection of the liquid crystal is induced by pressure difference. FIG. 3 shows a device for injecting the liquid crystal into the liquid crystal panel. As shown in FIG. 3, a container 12 in which the liquid crystal is contained is placed in a vacuum chamber 10, and the liquid crystal panel is located on an upper portion of the container 12. The vacuum chamber 10 is connected to a vacuum pump to maintain a vacuum state. Further, a liquid crystal panel moving device (not shown) is installed in the vacuum chamber 10 to move the liquid crystal panel from the upper part of the container 12 to the surface of the liquid crystal to contact an injection opening 16 of the liquid crystal panel 1 with the liquid crystal 14 (this method is called as liquid crystal dipping injection method).

When the vacuum in the chamber 10 is released by introducing nitrogen gas (N2) into the vacuum chamber 10 so that the injection opening of the liquid crystal panel 1 contacts the liquid crystal, liquid crystal 14 is injected into the panel through the injection opening by the pressure difference between the pressure in the liquid crystal panel and the pressure of the vacuum chamber. After the liquid crystal is entirely filled into the panel 1, the injection opening 16 is sealed by a sealing material to seal the liquid crystal layer (this method is called as vacuum injection method of liquid crystal).

However, there are several problems in the liquid crystal dipping injection method and/or vacuum injection method as follow.

First, time for the liquid crystal injection into the panel 1 is increased. Generally, a gap thickness between the driving device array substrate and the color filter substrate in the liquid crystal panel is very narrow as order of magnitude of micrometers, and therefore, a very small amount of liquid crystal is injected into the liquid crystal panel per unit time. For example, it takes about 8 hours to inject the liquid crystal completely in fabrication process of the 15 inches-liquid crystal panel 15, the liquid crystal fabrication process time is increased due to the liquid crystal injection of long time, thereby reducing fabricating efficiency.

Second, the liquid crystal consumption is increased in the above liquid crystal injection method. A small amount of liquid crystal of the liquid crystal contained in the container 12 is injected into the liquid crystal panel 10. On the other hand, when the liquid crystal is exposed to atmosphere or to a certain gas, the liquid crystal is contaminated by reaction with the gas. Therefore, the remaining liquid crystal should be discarded after the injection when the liquid crystal 14 contained in the container 12 is injected into a plurality of liquid crystal panels 10, thereby increasing the liquid crystal panel fabrication cost.

SUMMARY OF THE INVENTION

Accordingly, the present invention is directed to a liquid crystal dispensing apparatus with a nozzle protecting device that substantially obviates one or more of the problems due to limitations and disadvantages of the related art.

An object of the present invention is to provide a liquid crystal dispensing apparatus for dropping the liquid crystal directly onto a glass substrate of larger area including at least one unit liquid crystal panel area.

Another object of the present invention is to provide a liquid crystal dispensing apparatus to prevent a dropping amount of the liquid crystal from being changed or to prevent the liquid crystal from being dropped onto another area caused as a result of distortion or breakdown of the nozzle by an external force.

Still another object of the present invention is to provide a nozzle structure for a liquid crystal dispensing apparatus to prevent damage by an external force and to prevent a liquid crystal lumping phenomenon.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal dispensing apparatus for dispensing liquid crystal onto a substrate comprises a liquid crystal container for containing the liquid crystal to be dispensed onto the substrate; a nozzle disposed on a lower portion of the liquid crystal container, the nozzle including a main body portion, a discharging portion projecting from a lower surface of the main body portion for dispensing liquid crystal, and a protecting portion projecting from the lower surface of the main body portion for protecting the discharging portion, wherein the protecting portion projects from the lower surface of the main body portion at least as much as the discharging portion.

In another aspect, a nozzle structure for a liquid crystal dispensing apparatus comprises a main body portion; a discharging portion projecting from a surface of the main body portion through which liquid crystal is dispensed; and a protecting portion projecting from the surface of the main body portion to protect the discharging portion, wherein the protecting portion projects from the surface of the main body portion at least as much as the discharging portion.

In another aspect, a liquid crystal dispensing apparatus for dispensing liquid crystal onto a substrate comprises means for containing the liquid crystal to be dispensed onto the substrate; means for dispensing the liquid crystal onto the substrate as liquid crystal drops; protecting means for protecting the dispensing means from damage.

In another aspect, a liquid crystal dispensing apparatus for dispensing liquid crystal onto a substrate comprises a liquid crystal container for containing the liquid crystal to be dispensed onto the substrate; a case in which the liquid crystal container is disposed; a nozzle disposed on a lower portion of the liquid crystal container, the nozzle including a main body portion, a discharging portion projecting from a lower surface of the main body portion for dispensing liquid crystal, a protecting wall formed around the discharging portion and projecting from the lower surface of the main body portion by a distance greater than the discharging portion to protect the discharging portion, and a fluorine resin formed on at least a surface of the discharging portion; a needle sheet disposed between the liquid crystal container and the nozzle, the needle sheet having a discharging hole through which the liquid crystal is discharged; a needle member disposed in the liquid crystal container, the needle member being moveable between a down position where an end of the needle member contacts the needle sheet to block flow of the liquid crystal through the discharging hole of the needle sheet and an up position where the needle is separated from the needle sheet; a spring member to bias the needle member toward the down position; a solenoid system to generate a magnetic force to move the needle member to the up position when the solenoid system is actuated; and a gas supply to provide a gas pressure to drive the liquid crystal through the nozzle when the needle member is in the up position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In order to solve the problems of the conventional liquid crystal injection methods such as a liquid crystal dipping method or liquid crystal vacuum injection method, a liquid crystal dropping method has been introduced recently. The liquid crystal dropping method is a method for forming a liquid crystal layer by directly dropping the liquid crystal onto the substrates and spreading the dropped liquid crystal over the entire panel by pressing together the substrates during the assembling procedure of the substrates, rather than by injecting the liquid crystal into the empty unit panel by the pressure difference between the inner and outer sides of the panel. According to the above liquid crystal dropping method, the liquid crystal is directly dropped onto the substrate in a short time period so that the liquid crystal layer in the LCD of larger area can be formed quickly. In addition, the liquid crystal consumption can be minimized due to the direct dropping of the liquid crystal as much as required amount, and therefore, the fabrication cost can be reduced.

Figure 4:
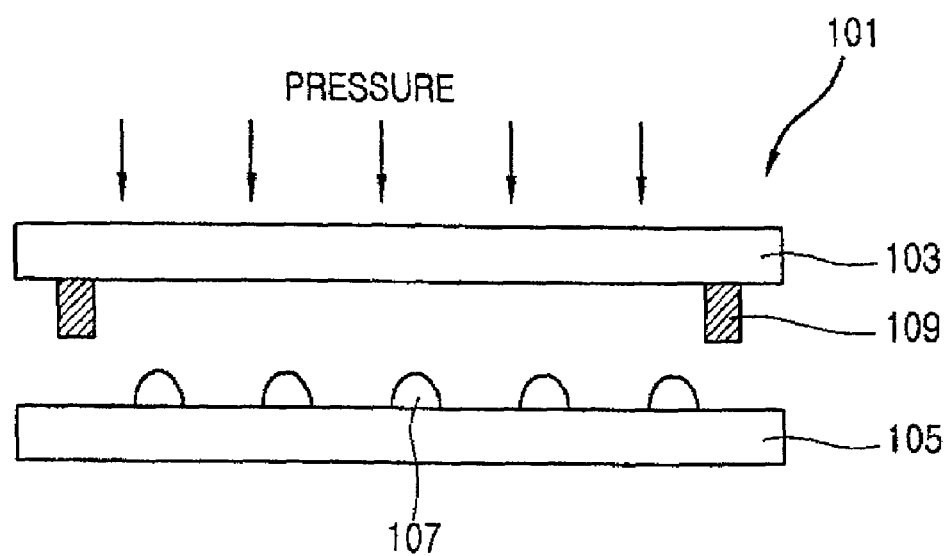
FIG. 4 is a view showing an exemplary LCD fabricated using a method for dropping liquid crystal according to the present invention.

FIG. 4 is a view showing basic concept of the liquid crystal dropping method. As shown, in the liquid crystal dropping method, the liquid crystal is dropped onto a lower substrate 105 before assembling the lower substrate 105 and an upper substrate 103 having a driving device and a color filter respectively. Alternatively, the liquid crystal 107 may be dropped onto the substrate 103 on which the color filter is formed. That is, the liquid crystal may be formed either on a TFT (thin film transistor) substrate or on a CF (color filter) substrate. However, the substrate on which the liquid crystal is dropped should preferably be located on lower part when the substrates are assembled.

At that time, a sealing material 109 is applied on an outer part of the upper substrate 103, and therefore, the upper substrate 103 and the lower substrate 105 are attached as the upper substrate 103 and the lower substrate 105 are compressed. At the same time, the liquid crystal drop 107 spreads out by the pressure, thereby forming a liquid crystal layer of uniform thickness between the upper substrate 103 and the lower substrate 105. That is, with the liquid crystal dropping method, the liquid crystal 107 is dropped onto the lower substrate 105 before the panel 101 is assembled, and subsequently the upper substrate 103 and the lower substrate 105 are attached by the sealing material 109.

Figure 5:
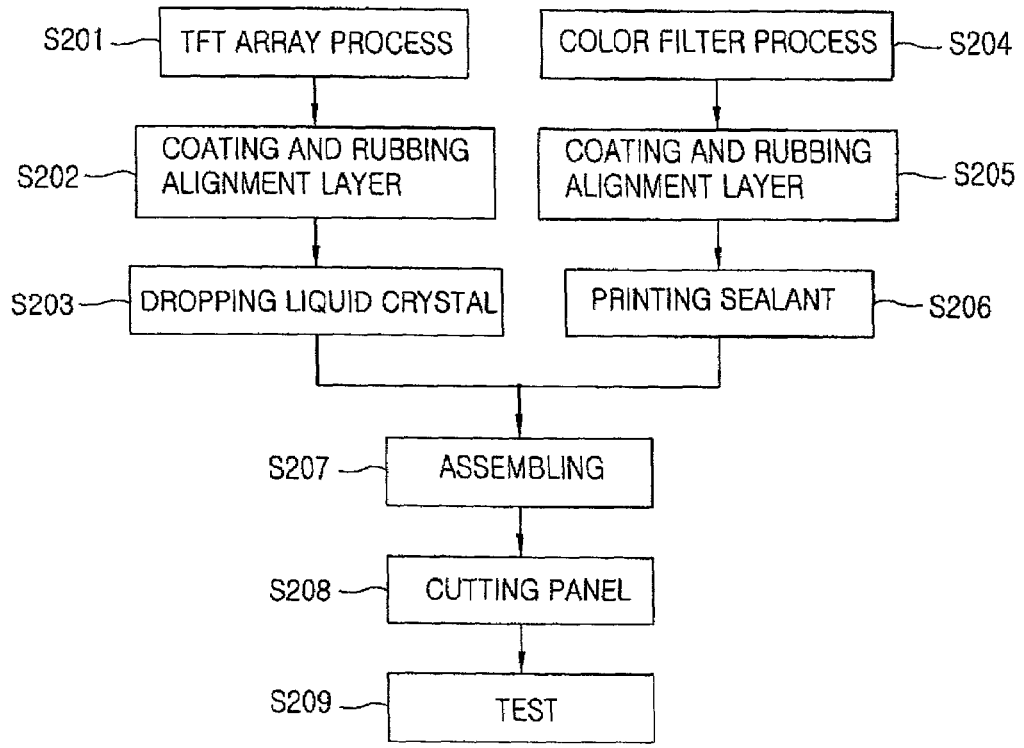
FIG. 5 is a flow chart showing an exemplary method for fabricating the LCD according to the liquid crystal dropping method.

FIG. 5 shows a method for fabricating the LCD by applying the above liquid crystal dropping method. As shown, the driving devices such as the TFT and the color filter layers are formed on the upper substrate and on the lower substrate with the TFT array process and the color filter process, respectively (S201 and S202). The TFT array process and the color filter process are generally similar to those of the conventional processes shown in FIG. 2. These processes are proceeded on the glass substrate having a plurality of the unit panel areas. Applying the liquid crystal dropping method to a manufacturing of the LCD, in particular, we can use effectively a glass substrate of large area having 1000×1200 mm² or more, which is much larger than that of the conventional fabrication method.

On the lower and upper substrates on which the TFT and the color filter layer are respectively formed, the alignment layers are formed and rubbed (S202 and S205). The liquid crystal is dropped onto the liquid crystal unit panel area of the lower substrate and the sealing material is applied onto the outer portion area of the liquid crystal unit panel area on the upper substrate (S203 and S206).

Thereafter, the upper and lower substrates are disposed facing each other and compressed to attach to each other using the sealing material. By this compression, the liquid crystal drops spread out on entire panel evenly (S207). By this process, a plurality of liquid crystal unit panel areas, on which the liquid crystal layers are formed, are disposed on the assembled large glass substrates (the attached lower and upper substrates). Then, the assembled glass substrates are processed and cut into a plurality of liquid crystal unit panels (S208). The resultant liquid crystal unit panels are inspected, thereby finishing the LCD panel process (S208 and S209).

Figure 1:
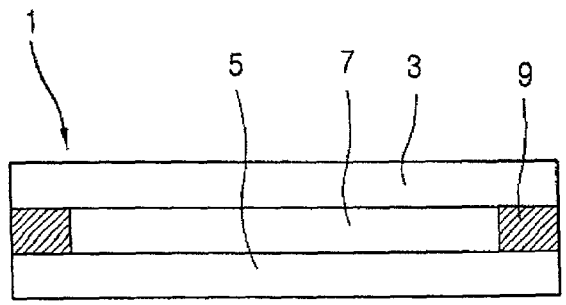
FIG. 1 is a cross-sectional view showing a general LCD.
Figure 2:
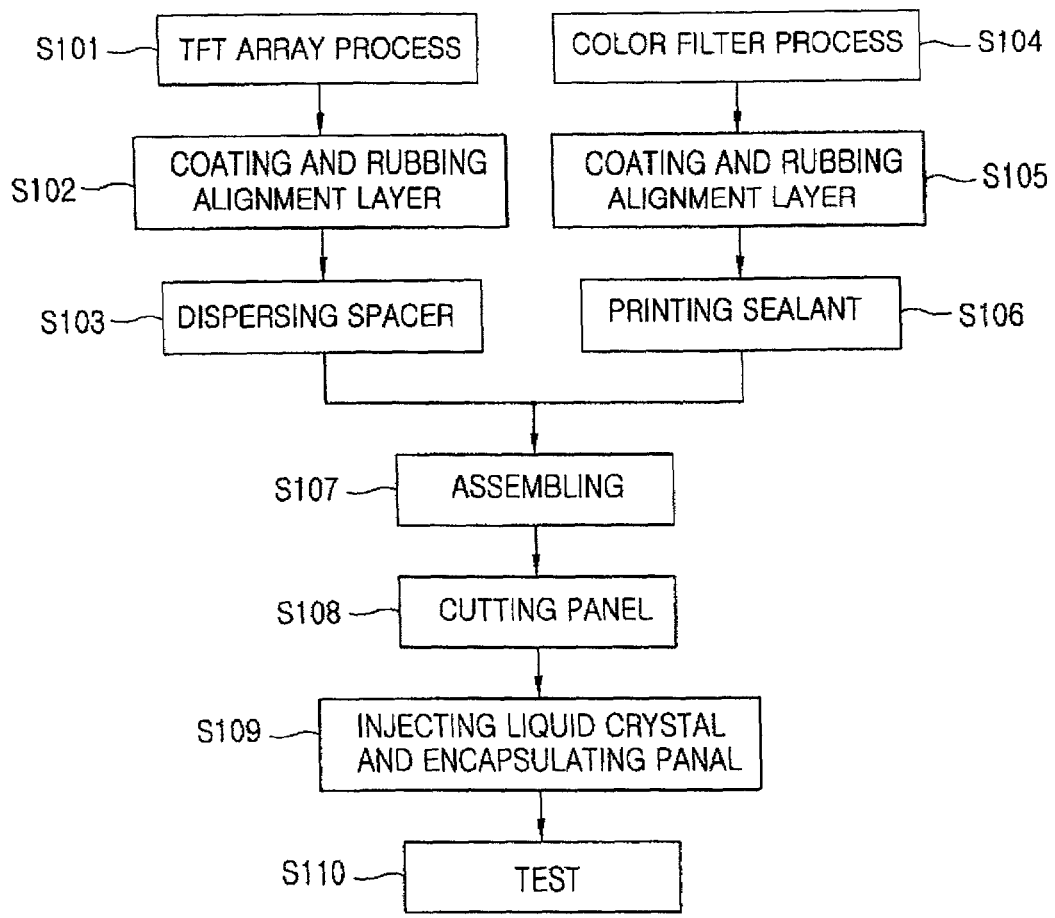
FIG. 2 is a flow chart showing a conventional method for fabricating the LCD.
Figure 3:
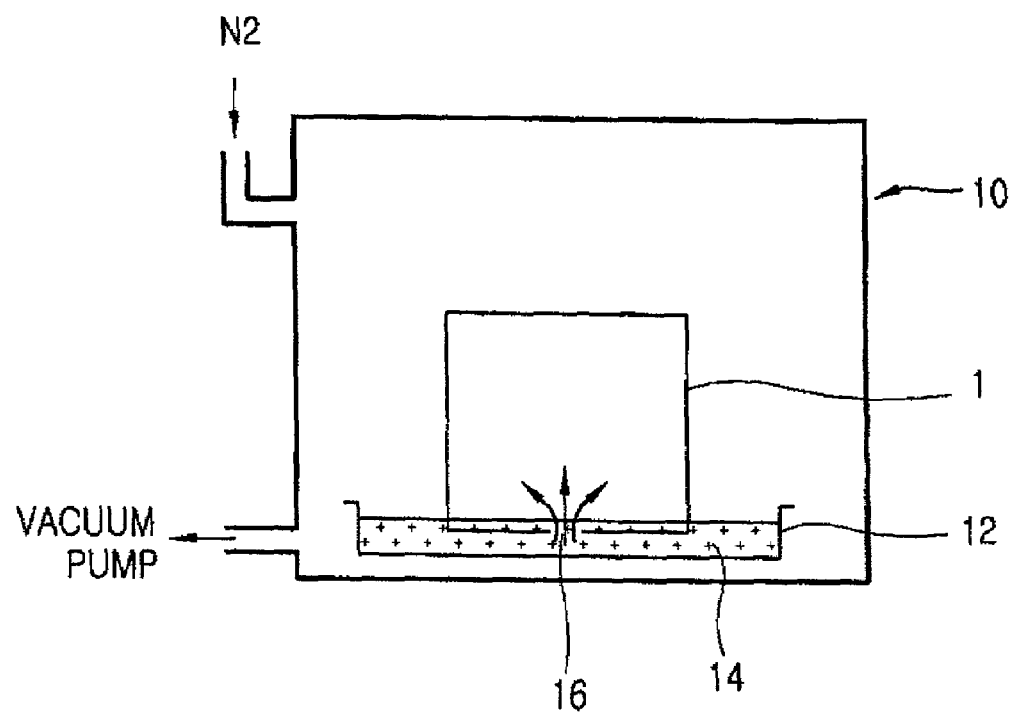
FIG. 3 is a view showing liquid crystal injection in the conventional method for fabricating the LCD.

The difference between the method for fabricating the LCD by applying the liquid crystal dispensing method shown in FIG. 5 and the method for fabricating the LCD by applying the conventional liquid crystal injection method shown in FIG. 2 will be described as follows. First, there is the difference between the dropping and injecting of the liquid crystal as well as the difference in the fabricating time of a larger area LCD. Moreover, in the injection method for fabricating the LCD of FIG. 2, the liquid crystal is injected through an injection opening and then the injection opening is sealed with a sealing material. However, with the dropping method of fabricating the LCD of FIG. 5, the liquid crystal is dropped directly onto the substrate so that the sealing process of an injection opening is not needed. In addition, in the injection method of FIG. 2, the panel is contacted with the liquid crystal contained in the container during the liquid crystal injection process, thereby contaminating the outer surface of the panel. Thus, a cleaning process of the substrate is necessary. However, with the liquid crystal dispensing method of FIG. 5, the liquid crystal is directly dropped onto the substrate. Therefore, the panel is not contaminated by the liquid crystal, and the cleaning process is not needed. Accordingly, the method for fabricating LCD by the liquid crystal dispensing method is simpler than that by the liquid injection method, thereby improving efficiency and yield.

In the method for fabricating LCD adopting the liquid crystal dispensing method, the dropping position of the liquid crystal and the dropping amount of the liquid crystal should be controlled to form the liquid crystal layer with a desired thickness. Since the thickness of the liquid crystal layer is closely related to the cell gap of the liquid crystal panel, the dropping position and the dropping amount of the liquid crystal should be carefully controlled to prevent the inferiority of the liquid crystal panel. Therefore, the present invention provides a dispensing apparatus for dropping specific amount of liquid crystal at a predetermined position.

Figure 6:
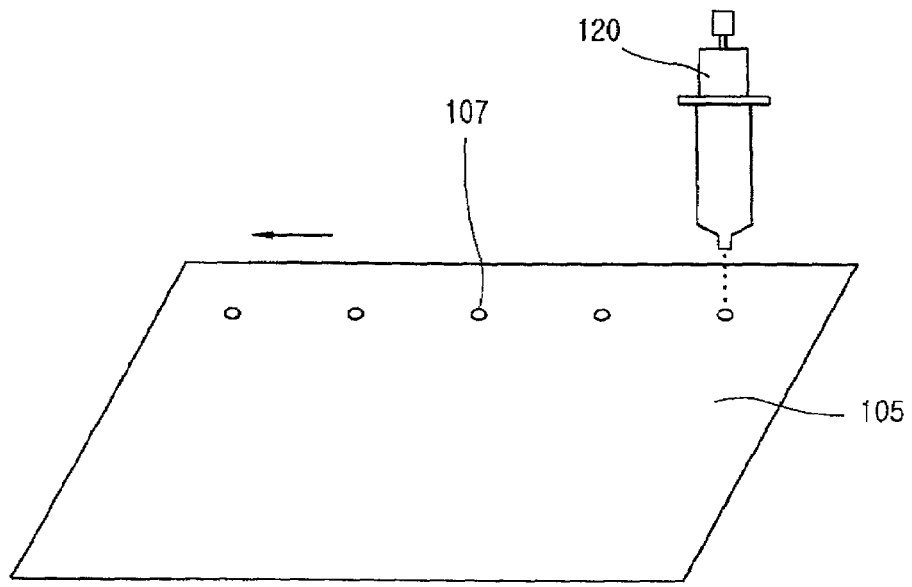
FIG. 6 is a view showing basic concept of the liquid crystal dropping method.

FIG. 6 shows a generalized arrangement for dropping the liquid crystal 107 onto the substrate 105 (glass substrate of larger area) using the liquid crystal dispensing apparatus 120 according to the present invention. As shown, the liquid crystal dispensing apparatus 120 is installed above the substrate 105. Although not shown in FIG. 6, liquid crystal to be dropped onto the substrate is contained in the liquid crystal dispensing apparatus 120.

Generally, the liquid crystal 107 is dropped onto the substrate as drops. The substrate 105 moves in the x and y-directions at a predetermined speed while the liquid crystal dispensing apparatus 120 discharges the liquid crystal at a predetermined time intervals. Therefore, the liquid crystal 107 dropping onto the substrate 105 is generally arranged toward x and y direction with predetermined intervals therebetween. Alternatively, the substrate 105 may be fixed, while the liquid crystal dispensing apparatus 120 is moved in the x and y directions to drop the liquid crystal 107 with a predetermined interval. However, the liquid crystal drop shape may be trembled by the movement of the liquid crystal dispensing apparatus 120, so errors in the dropping position and the dropping amount of the liquid crystal may occur. Therefore, it is preferable that the liquid crystal dispensing apparatus 120 be fixed and that the substrate 105 move.

Figure 7A:
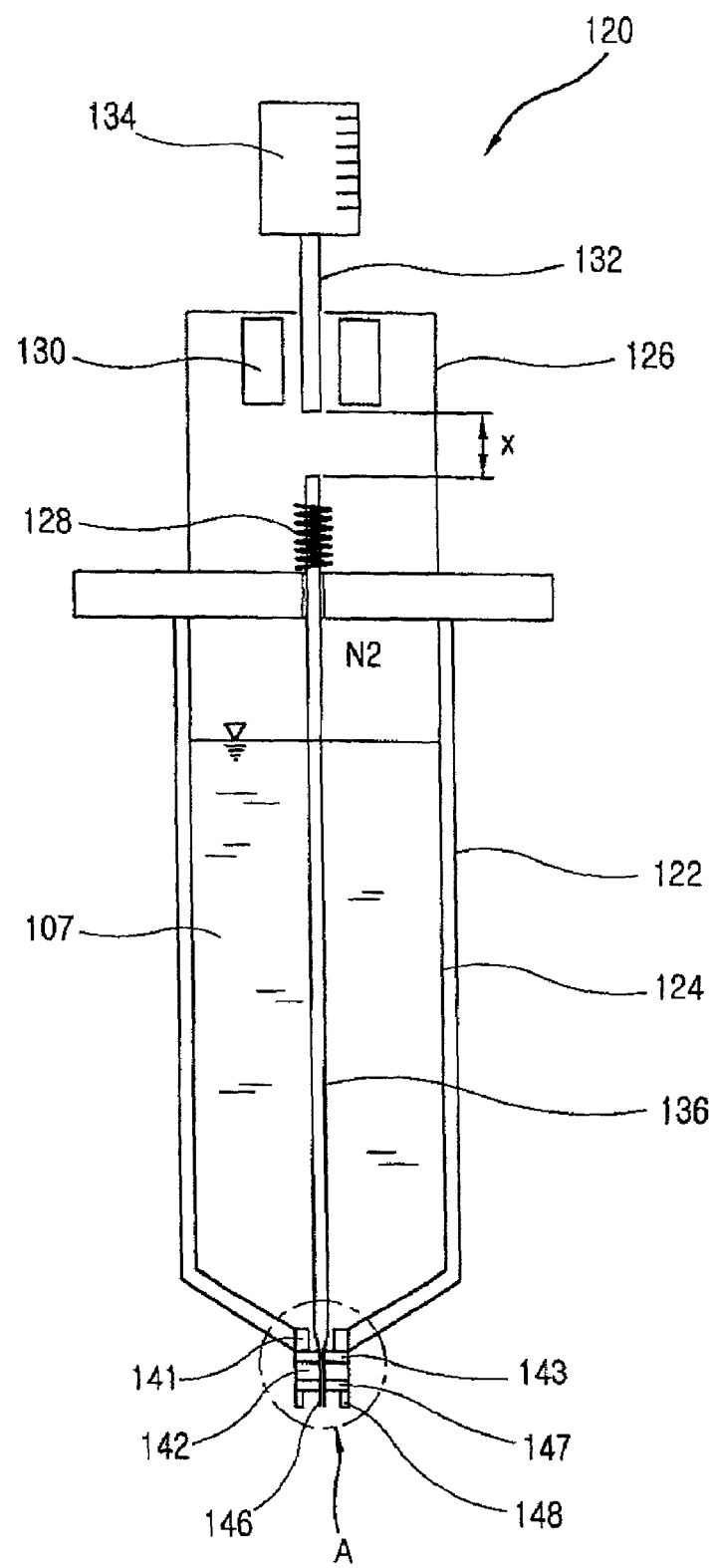
FIGS. 7A and 7B are views showing a structure of an exemplary liquid crystal dispensing apparatus according to the present invention.
Figure 7B:
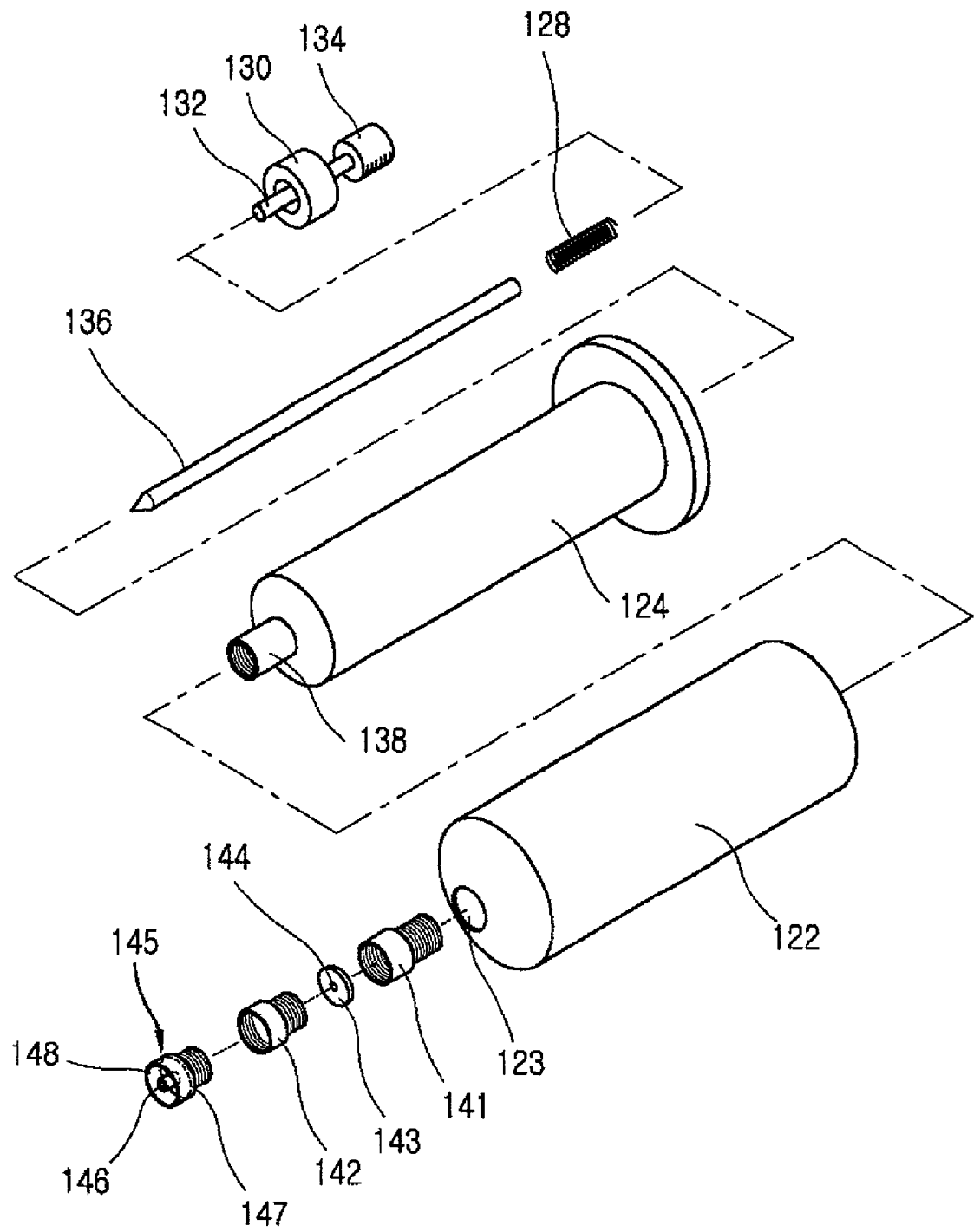

FIG. 7A is a cross-sectional view showing an exemplary liquid crystal dispensing apparatus according to the present invention, and FIG. 7B is an exploded perspective view. The liquid crystal dispensing apparatus 120 according to the present invention will now be described in detail.

As shown, a cylindrical liquid crystal container 124 is enclosed in a case 122 of the liquid crystal dispensing apparatus. The liquid crystal container 124 containing the liquid crystal 107 may be made of polyethylene. Further, the case 122 is made of a stainless steel to enclose the liquid crystal container 124 therein. Generally, because the polyethylene has superior plasticity, it can be easily formed in the desired shape. Since polyethylene does not react with the liquid crystal 107 when the liquid crystal 107 is contained therein, the polyethylene can be used for the liquid crystal container 124. However, the polyethylene has a weak strength so that it can be easily distorted by external shocks or other stresses. For example, when the polyethylene is used as the liquid crystal container 124, the container 124 may become distorted so that the liquid crystal 107 cannot be dropped at the exact position. Therefore, the container 124 should be enclosed in the case 122 made of the stainless steel or other material having greater strength. Although not shown, a gas supply tube connected to an exterior gas supply unit may be formed on an upper part of the liquid crystal container 124. An inert gas, such as nitrogen, is provided through the gas supply tube from the gas supply unit to fill the portion where the liquid crystal is not filled. Thus, the gas pressure compresses the liquid crystal to be dispensed.

On the lower portion of the case 122, an opening 123 is formed. When the liquid crystal container 124 is enclosed in the case 122, a protrusion 138 formed on a lower end portion of the liquid crystal container 124 is inserted into the opening 123 so that the liquid crystal container 124 is connected to the case 122. Further, the protrusion 138 is connected to a first connecting portion 141. As shown, a nut (female threaded portion) is formed on the protrusion 138, and a bolt (male threaded portion) is formed on one side of the first connecting portion 141 so that the protrusion 138 and the first connecting portion 141 are interconnected by the nut and the bolt. Of course, it should be recognized that in this description and in the following description other connection types or configurations may be used.

A nut is formed on the other side of the first connecting portion 141 and a bolt is formed on one side of a second connection portion 142, so that the first connecting portion 141 and the second connecting portion 142 are interconnected. A needle sheet 143 is located between the first connecting portion 141 and the second connecting portion 142. The needle sheet 143 is inserted into the nut of the first connecting portion 141, and then the needle sheet 143 is combined between the first connecting portion 141 and the second connecting portion 142 when the bolt of the second connecting portion 142 is inserted and bolted. A discharging hole 144 is formed on the needle sheet 43, and the liquid crystal 107 contained in the liquid crystal container 124 is discharged through the discharging hole 144 passing through the second connecting portions 142.

A nozzle 145 is connected to the second connecting portion 142. The nozzle 145 is used to drop the liquid crystal 107 contained in the liquid crystal container 124 as much as a small amount. The nozzle 145 comprises a supporting portion 147 including a bolt connected to the nut at one end of the second connecting portion 142 to connect the nozzle 145 with the second connecting portion 142, a discharging opening 146 protruded from the supporting portion 147 to drop a small amount of liquid crystal onto the substrate as a drop, and a protecting wall 148 formed on an outer portion of the supporting portion 147 to protect the discharging opening 146.

A discharging tube extended from the discharging hole 144 of the needle sheet 143 is formed in the supporting portion 147, and the discharging tube is connected to the discharging opening 146. Generally, the discharging opening 146 of the nozzle 145 has very small diameter to finely control the liquid crystal dropping amount, and the discharging opening 146 protrudes from the supporting portion 147. Therefore, the nozzle 145 may be affected by external forces when the nozzle 145 is connected to the second connecting portion 142 or separated from the second connecting portion 142. For example, if the discharging opening 146 is distorted or damaged, when the nozzle 145 is connected to the second connecting portion 142, the diameter and the direction of the discharging opening 146 is changed. As a result, the liquid crystal dropping onto the glass substrate cannot be controlled precisely. In addition, the liquid crystal may be sputtered through damaged portion so that the liquid crystal is dropped into unwanted position. Even the liquid crystal may not be able to be dropped at all due to a breakdown of the discharging opening 146. Especially, if the liquid crystal drops are sputtered toward the sealing area (the area on which the sealing material is applied and the upper substrate and the lower substrate are attached thereby) due to the damage of the discharging opening 146, the sealing material is broken around the area where the liquid crystal is sputtered when both substrates are attached, thereby causing a defect on the liquid crystal panel.

The protecting wall 148 for protecting the discharging opening 146 prevents the discharging opening 146 of the nozzle 145 from being damaged. That is, as shown, the protecting wall 148 of predetermined height is formed around the discharging opening 146, to prevent external forces from damaging the discharging opening 146.

A needle 136 is inserted into the liquid crystal container 124, and one end part of the needle 136 is contacted with the needle sheet 143. Especially, the end part of the needle 136 contacted with the needle sheet 143 is conically formed to be inserted into the discharging hole 144 of the needle sheet 143 to close the discharging hole 144.

Further, a spring 128 is installed on the other end of the needle 136 located in an upper case 126 of the liquid crystal dispensing apparatus 120 to bias the needle 136 toward the needle sheet 143. A magnetic bar 132 and a gap controlling unit 134 are connected above the needle 136. The magnetic bar 132 is made of magnetic material such as a ferromagnetic material or a soft magnetic material, and a solenoid coil 130 of cylindrical shape is installed on outer side of the magnetic bar 132 to be surrounded thereof. The solenoid coil 130 is connected to an electric power supplying unit (not shown in figure) to supply electric power thereto, thereby generating a magnetic force on the magnetic bar 132 as the electric power is applied to the solenoid coil 130.

The needle 136 and the magnetic bar 132 are separated with a predetermined interval (x). When the electric power is applied to the solenoid coil 130 from the electric power supplying unit 150 to generate the magnetic force on the magnetic bar 132, the needle 136 contacts the magnetic bar 132 as a result of the generated magnetic force. When the electric power supplying is stopped, the needle 136 is returned to the original position by the elasticity of the spring 128. By the movement of the needle in up-and-down direction, the discharging hole 144 formed on the needle sheet 143 is opened or closed. The end of the needle 136 and the needle sheet 143 repeatedly contact each other according to the supplying status of the electric power to the solenoid coil 130. Thus, the part of the needle 136 and the needle sheet 143 may be damaged by the repeated shock caused by the repeated contact. Therefore, it is desirable that the end part of the needle 136 and the needle sheet 143 are preferably formed by using a material which is strong to shock, for example, the hard metal to prevent the damage caused by the shock. Also, the needle 136 should be formed of a magnetic material in this exemplary configuration to be magnetically attracted to the magnetic bar 132.

Figure 8:
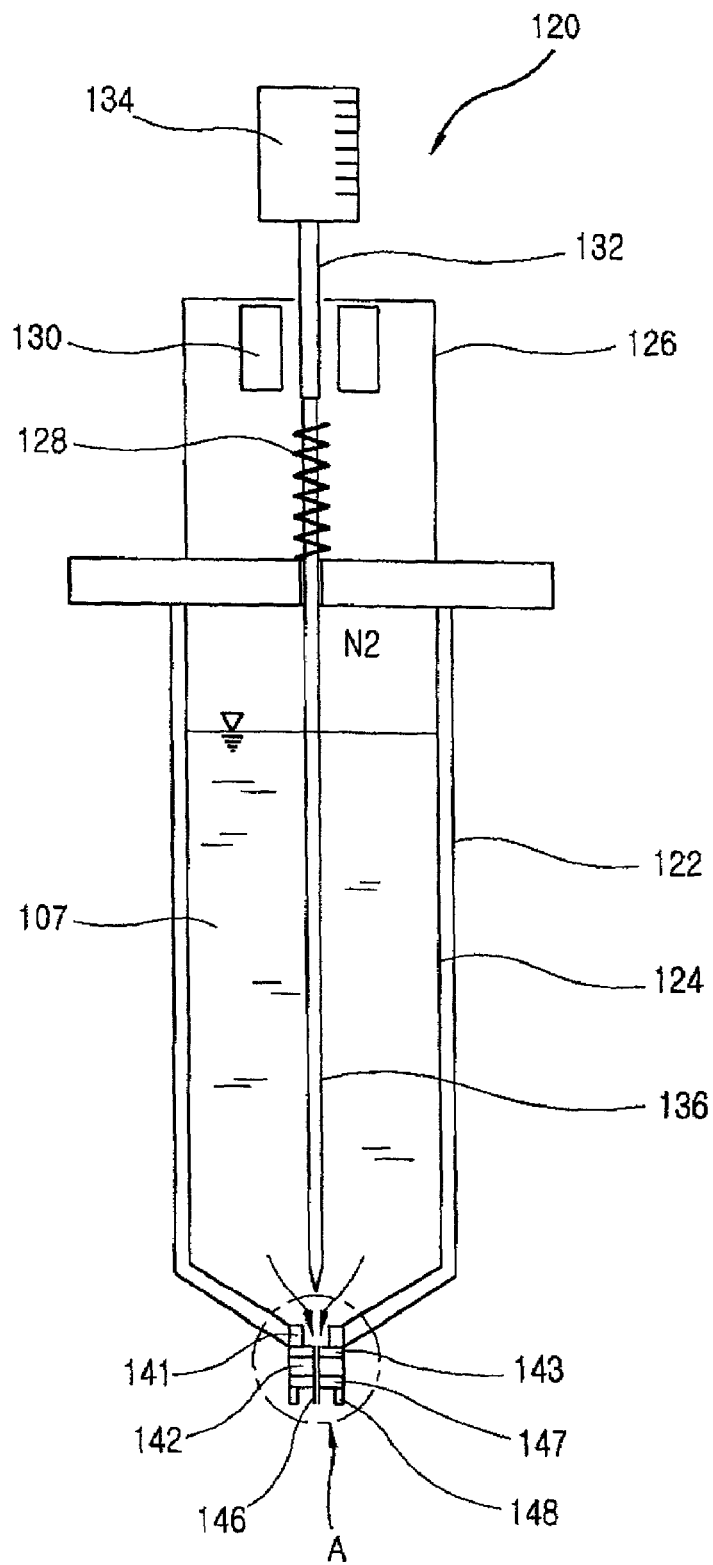
FIG. 8 is a view showing a structure of the liquid crystal dispensing apparatus of FIGS. 7A and 7B when the liquid crystal is dropped according to the present invention.

FIG. 8 shows the liquid crystal dispensing apparatus 120 in which the discharging hole 144 of the needle sheet 143 is opened by the moving of the needle 136 in the upper direction. As the discharging hole 144 of the needle sheet 143 is opened, the gas (preferably $N_2$ gas) supplied to the liquid crystal container 124 compresses the liquid crystal 107 to start the dropping of the liquid crystal 107 through the nozzle 145. The dropping amount of the liquid crystal 107 is dependant upon the opening time of the discharging hole 144 and the pressure compressed onto the liquid crystal 107. The opening time is determined by the distance (x) between the needle 136 and the magnetic bar 132, the magnetic force of the magnetic bar 132 generated by the solenoid coil, and the elastic force of the spring 128 installed on the needle 136. The magnetic force of the magnetic bar 132 can be controlled according to the winding number of the solenoid coil 130 installed around the magnetic bar 132 or the magnitude of the electric power applied to the solenoid coil 130. The distance x between the needle 136 and the magnetic bar 132 can be controlled by the gap controlling unit 134.

Also, although not shown, the solenoid coil 130 may be installed around the needle 136 instead of the magnetic bar 132. In this case, the needle 136 is made of the magnetic material, and therefore, the needle 136 is magnetized when the electric power is applied to the solenoid coil 130. Consequently, the needle 136 moves in the upper direction to contact with the bar 132 because the bar 132 is fixed and the needle 136 moves in the up-and-down direction.

Figure 9A:
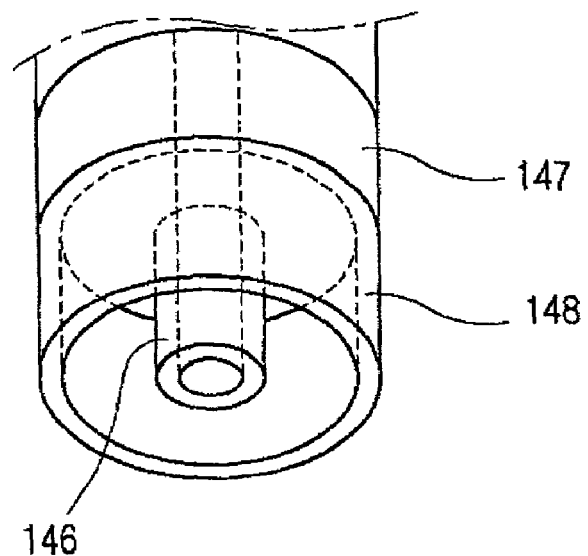
FIGS. 9A and 9B are views showing a nozzle structure for the exemplary liquid crystal dispensing apparatus of FIGS. 7A and 7B according to the present invention.
Figure 9B:
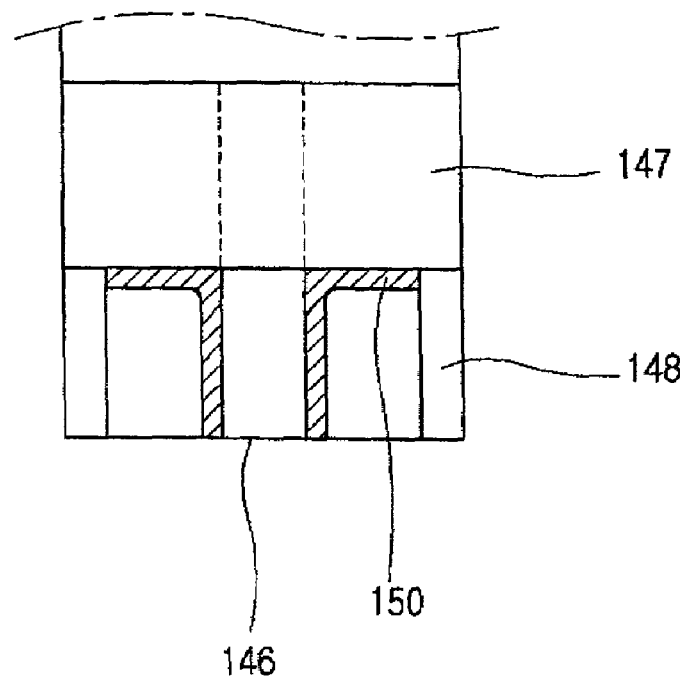

FIGS. 9A and 9B provide enlarged views of portion A in FIG. 7A. Here, FIG. 9A is a perspective view, and FIG. 9B is a cross-sectional view. As shown, the protecting wall 148 is formed around the discharging opening 146 of the nozzle 145 to be the same or higher height than that of the discharging opening 146. In an exemplary configuration, the discharging opening 146 projects a distance of about 0.8 times the distance of the protecting wall 148. Therefore, the distortion or damage of the discharging opening 146 due to the devices such as a tool for connecting when the nozzle 145 is connected or separated can be prevented.

Also, the size (diameter) of the nozzle 145 is beneficially increased due to the large protecting wall 145. Generally, the size of the nozzle 145 is very small. Thus, it is very difficult to handle when the nozzle 145 is connected to or separated from the second connecting portion 142. However, if the size of the nozzle 145 is increased by forming the protecting wall 148 as in the present invention, the workability of the nozzle 145 is improved thereby facilitating connection and separation of the nozzle 145.

Though the protecting wall 148 may be formed using any material that can protect the discharging opening 146 from the external force. However, the stainless steel or other hard metal with high strength is preferred.

Further, as shown in FIG. 9B, a material having higher contact angle for the liquid crystal such as a fluorine resin 150 is applied around the discharging opening 146 of the nozzle 145. The contact angle is an angle defined when liquid makes a thermodynamic balance on a surface of solid material. The contact angle of the liquid is a measure representing a wettability on the surface of the solid material. Generally, the nozzle 145 is made of the metal having the low contact angle. However, the metal has high wettability (that is, high hydrophilic property) and high surface energy. Thus, the liquid crystal very easily spreads out onto metal. In addition, if the liquid crystal is dropped through the nozzle 145 made of the metal, the liquid crystal is not disposed as drops (a drop shape means that the contact angle is high) at the end part of the discharging opening 146 on the nozzle 145, but instead spreads out on the surface of the nozzle 145. As the liquid crystal dropping is repeated, the liquid crystal spreads onto the surface of the nozzle 145 and lumps.

The phenomenon of the liquid crystal spreading out onto the surface of the nozzle 145 makes the exact liquid crystal dropping impossible. If the amount of liquid crystal discharged through the discharging opening 146 of the nozzle 145 is controlled by controlling the opening time of the discharging opening and the gas pressure compressing the liquid crystal, some of the liquid crystal spreads out onto the surface of the nozzle 145. Therefore, the actual dropping amount of liquid crystal is smaller than the amount of the liquid crystal discharged through the discharging opening 146. Of course, the discharged amount may be controlled considering the amount of the liquid crystal spread out on the surface. However, it is not possible to calculate the amount of the liquid crystal spread out on the surface of the nozzle 145.

Also, since the liquid crystal lumped on the nozzle 145 by the repeated dropping operations may later be added to the amount of the liquid crystal being discharged through the discharging opening 146, a larger dropping amount than expected may be dropped onto the substrate. That is, the dropping amount of the liquid crystal is irregular or unpredictable due to the low contact angle characteristic of the metal—liquid crystal interface.

In contrast, if a fluorine resin film 150 having higher contact angle is formed on the nozzle 145, especially, around the discharging opening 146 of the nozzle 145, the liquid crystal 107 discharged through the discharging opening 146 makes a nearly perfect drop shape instead of being spread out on the surface of the nozzle 145. Consequently, the liquid crystal can be dropped onto the substrate precisely as amount expected.

The fluorine resin film 150 is a teflon coating film. Three basic forms of teflons, that is, polytetrafluoro ethylene (PTFE), fluorinated ethylene prophylene (FEP), and polyfluoroalkoxy (PEA) can preferably be used. Also, an organic compound can be added to the basic forms. The fluorine resin film 150 is formed on the surface of the nozzle 145 by a dipping or spraying method. In FIG. 9B, the fluorine resin film 150 is formed only around the discharging opening 146, but it may be applied to entire nozzle 145 including the protecting wall 148. The fluorine resin has high contact angle, and also, has various excellent characteristics such as abrasion resistance, heat resistance, and chemical resistance. Therefore, the application of the fluorine resin film 150 is able to prevent the distortion and damage of the nozzle 145 by the external forces effectively.

Figure 10:
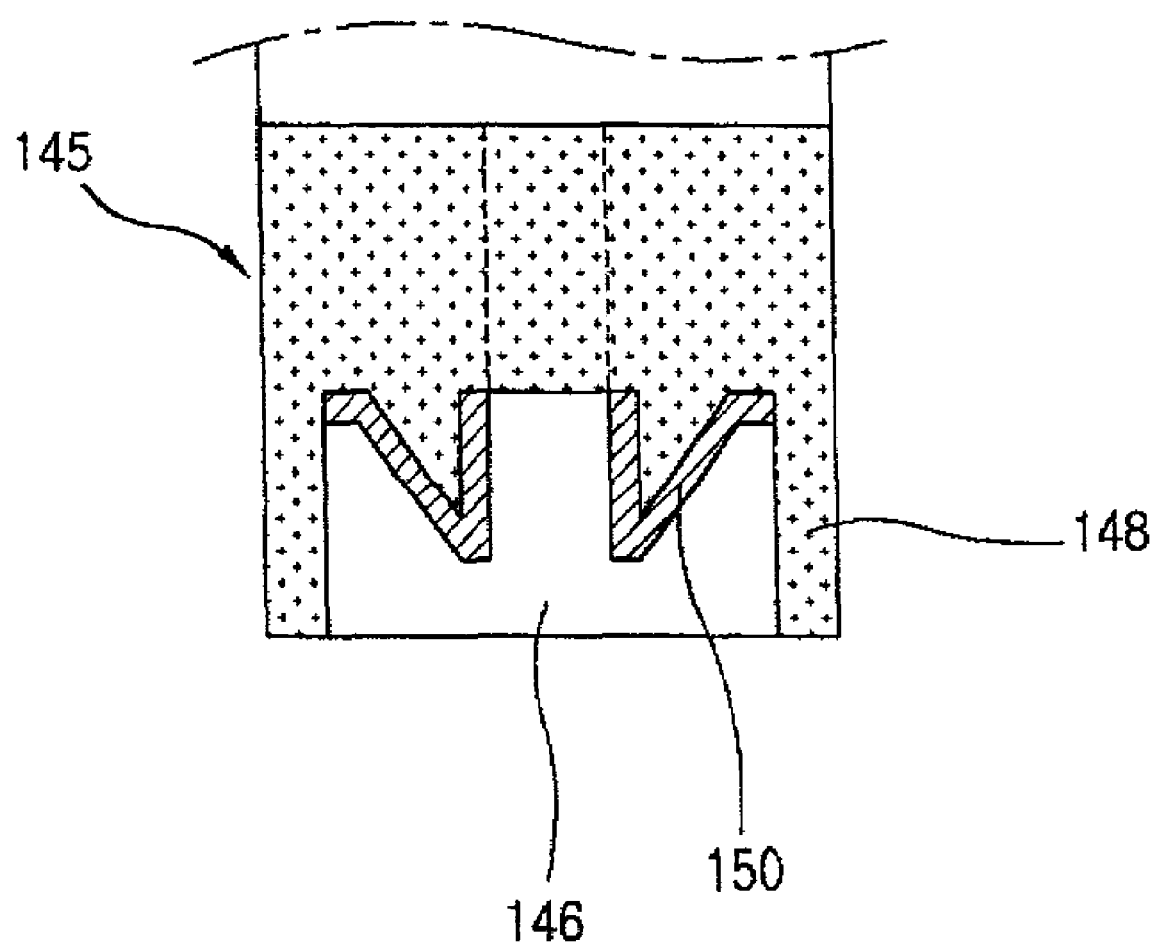
FIG. 10 is a view showing another exemplary nozzle structure for a liquid crystal dispensing apparatus according to the present invention.

Of course it should be recognized that the dispensing apparatus or nozzle configuration can be varied in accordance with the present invention. For example, a nozzle with a sloped discharging opening as shown in FIG. 10 can be used. Also, a container without a case can be used as disclosed in Korean Patent Application Nos. 9122/2002 and 10617/2002 which are hereby incorporated by reference.

As described above, in the present invention, the protecting wall is installed and the fluorine resin film is formed on the nozzle of the liquid crystal dispensing apparatus, and therefore, following effects can be gained. First, the protecting wall is formed around the discharging opening of the nozzle, and therefore the distortion and the damage of the discharging opening can be prevented when the nozzle is connected or separated. In addition, the inferiority of the liquid crystal dropping caused by the distortion or the damage of the discharging opening can be prevented. Second, the phenomena that the liquid crystal is sputtered to the sealing area by the distortion of the discharging opening and the sealing area is broken by the sputtered liquid crystal when the upper substrate and the lower substrate are attached can be prevented by the protecting wall. Third, the fluorine resin film is formed around the discharging opening of the nozzle, thereby permitting an exact amount of liquid crystal to be dropped on the substrate. Fourth, the fluorine resin film is formed around the discharging opening and on the entire nozzle to increase the strength of the nozzle, and thereby the nozzle is not affected by the external forces.

It will be apparent to those skilled in the art that various modifications and variations can be made in the liquid crystal dispensing apparatus with nozzle protecting device of the present invention without departing from the spirit or scope of the invention. Thus, it is intended that the present invention cover the modifications and variations of this invention provided they come within the scope of the appended claims and their equivalents.

What is claimed is:

1. A liquid crystal dispensing apparatus for dispensing liquid crystal onto a substrate, comprising:
    a liquid crystal container for containing the liquid crystal to be dispensed onto the substrate;
    a nozzle disposed on a lower portion of the liquid crystal container, the nozzle including a main body portion, a discharging portion protruding from a lower surface of the main body portion for dispensing liquid crystal, and a protecting portion protruding from the lower surface of the main body portion for protecting the discharging portion, the protecting portion protruding more from the lower surface than the discharging portion;
    a needle sheet between the liquid crystal container and the nozzle, the needle sheet having a discharging hole through which the liquid crystal is discharged; and
    a needle member in the liquid crystal container to be biased by a magnetic force, the needle member being moveable between a down position where an end of the needle member is inserted into the discharging hole of the needle sheet to block a flow of the liquid crystal and an up position where the needle member is separated from the needle sheet.

2. The liquid crystal dispensing apparatus according to claim 1, further comprising: a case in which the liquid crystal container is disposed.

3. The liquid crystal dispensing apparatus according to claim 1, further comprising: a connection disposed on the lower portion of the liquid crystal container and on the nozzle to connect the nozzle to the liquid crystal container.

4. The liquid crystal dispensing apparatus according to claim 1, wherein the protecting portion is a wall formed around the discharging portion.

5. The liquid crystal dispensing apparatus according to claim 1, wherein the discharging portion projects from the lower surface by a distance of about 0.8 times a distance that the protecting portion projects.

6. The liquid crystal dispensing apparatus according to claim 1, further comprising: a fluorine resin film formed on the nozzle.

7. The liquid crystal dispensing apparatus according to claim 6, wherein the fluorine resin film is formed substantially on an entire exterior surface of the nozzle.

8. The liquid crystal dispensing apparatus according to claim 6, wherein the fluorine resin film is formed using one of a dipping method and a spraying method.

9. The liquid crystal dispensing apparatus according to claim 1,
    wherein the protecting portion projects from the lower surface of the main body portion at least as much as the discharging portion.

10. The liquid crystal dispensing apparatus according to claim 9, further comprising:
    a biasing member to bias the needle member toward the down position;
    a solenoid system to generate a magnetic force to move the needle member to the up position when the solenoid system is actuated.

11. The liquid crystal dispensing apparatus according to claim 9, further comprising a gas supply to provide a gas pressure to drive the liquid crystal through the nozzle when the needle member is in the up position.

12. A liquid crystal dispensing apparatus for dispensing liquid crystal onto a substrate, comprising:
    means for containing the liquid crystal to be dispensed onto the substrate;
    means for dispensing the liquid crystal onto the substrate as liquid crystal drops, said dispensing means including a main body portion, a discharge portion protruding from the main body portion, a needle sheet having a discharging hole, and a needle member moveable between a down position where an end of the needle member is inserted into the discharging hole of the needle sheet to block a flow of the liquid crystal and an up position where the needle member is separated from the needle sheet;
    means for operating the dispensing means by a magnetic force;
    means for connecting said means for containing the liquid crystal to said means for dispensing the liquid crystal; and
    protecting means for protecting the dispensing means from damage, said protecting means protruding from the main body portion by a distance greater than the discharging portion.

13. A liquid crystal dispensing apparatus for dispensing liquid crystal onto a substrate, comprising:
    a liquid crystal container for containing the liquid crystal to be dispensed onto the substrate;
    a case in which the liquid crystal container is disposed;
    a nozzle disposed on a lower portion of the liquid crystal container, the nozzle including a main body portion, a discharging portion protruding from a lower surface of the main body portion for dispensing liquid crystal, a protecting wall formed around the discharging portion and protruding from the lower surface of the main body portion by a distance greater than the discharging portion to protect the discharging portion, and a fluorine resin formed on at least a surface of the discharging portion;

a needle sheet disposed between the liquid crystal container and the nozzle, the needle sheet having a discharging hole through which the liquid crystal is discharged;

a needle member disposed in the liquid crystal container, the needle member being moveable between a down position where an end of the needle member contacts the needle sheet to block flow of the liquid crystal through the discharging hole of the needle sheet and an up position where the needle is separated from the needle sheet;

a spring member to bias the needle member toward the down position;

a solenoid system to generate a magnetic force to move the needle member to the up position when the solenoid system is actuated; and a gas supply to provide a gas pressure to drive the liquid crystal through the nozzle when the needle member is in the up position.

\* \* \* \*